United States Patent
Takayama

(10) Patent No.: US 10,684,034 B2
(45) Date of Patent: Jun. 16, 2020

(54) OUTDOOR UNIT OF AIR CONDITIONER

(71) Applicant: Mitsubishi Electric Corporation, Tokyo (JP)

(72) Inventor: Hiroyuki Takayama, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 6 days.

(21) Appl. No.: 16/089,095

(22) PCT Filed: May 31, 2016

(86) PCT No.: PCT/JP2016/066028
§ 371 (c)(1),
(2) Date: Sep. 27, 2018

(87) PCT Pub. No.: WO2017/208345
PCT Pub. Date: Dec. 7, 2017

(65) Prior Publication Data
US 2019/0203962 A1 Jul. 4, 2019

(51) Int. Cl.
*F24F 11/30* (2018.01)
*F24F 11/86* (2018.01)
(Continued)

(52) U.S. Cl.
CPC .............. *F24F 11/30* (2018.01); *F24F 1/24* (2013.01); *F24F 11/77* (2018.01); *F24F 11/86* (2018.01);
(Continued)

(58) Field of Classification Search
None
See application file for complete search history.

(56) References Cited

U.S. PATENT DOCUMENTS

| 8,011,199 | B1* | 9/2011 | Chen | F25B 49/022 |
| | | | | 62/228.5 |
| 2006/0112702 | A1* | 6/2006 | Martin | B60H 1/00378 |
| | | | | 62/180 |
| 2009/0160378 | A1* | 6/2009 | Hwang | H02P 27/08 |
| | | | | 318/400.3 |

FOREIGN PATENT DOCUMENTS

| CN | 104566826 A | 4/2015 |
| EP | 1496317 A1 | 1/2005 |

(Continued)

OTHER PUBLICATIONS

International Search Report of the International Searching Authority dated Aug. 30, 2016 for the corresponding nternational application No. PCT/JP2016/066028 (and English translation).

(Continued)

*Primary Examiner* — Mohammad Ali
*Assistant Examiner* — David Earl Ogg
(74) *Attorney, Agent, or Firm* — Posz Law Group, PLC

(57) ABSTRACT

An outdoor unit of an air conditioner includes a compressor-driving inverter circuit to convert direct current power for driving a compressor into pseudo three-phase alternating current power using a plurality of switching elements; a fan rotational speed detection unit to detect the fan rotational speed of a fan that cools the switching elements; an ambient temperature detection unit to detect the ambient temperature at a location where the air conditioner is located; and a compressor inverter drive unit to control the compressor rotational speed of the compressor by controlling the compressor-driving inverter circuit. The compressor inverter drive unit controls the compressor-driving inverter circuit on the basis of the fan rotational speed and the ambient temperature.

7 Claims, 6 Drawing Sheets

(51) Int. Cl.
　　　*F24F 11/77*　　　(2018.01)
　　　*F24F 1/24*　　　(2011.01)
　　　*G05B 19/042*　　　(2006.01)
　　　*F24F 110/12*　　　(2018.01)
　　　*F24F 110/30*　　　(2018.01)
　　　*F24F 140/50*　　　(2018.01)
　　　*F24F 1/06*　　　(2011.01)

(52) U.S. Cl.
　　　CPC .............. *G05B 19/042* (2013.01); *F24F 1/06* (2013.01); *F24F 2110/12* (2018.01); *F24F 2110/30* (2018.01); *F24F 2140/50* (2018.01); *G05B 2219/2614* (2013.01)

(56) References Cited

FOREIGN PATENT DOCUMENTS

| | | |
|---|---|---|
| JP | 2013-137132 A | 7/2013 |
| JP | 2013-245922 A | 12/2013 |
| JP | 2015-017734 A | 1/2015 |
| WO | 03/0383376 A1 | 10/2003 |

OTHER PUBLICATIONS

Office Action dated Mar. 2, 2020 issued in corresponding CN patent application No. 201680085913.5.

\* cited by examiner

OUTDOOR UNIT OF AIR CONDITIONER

CROSS REFERENCE TO RELATED APPLICATION

This application is a U.S. national stage application of International Patent Application No. PCT/JP2016/066028 filed on May 31, 2016, the disclosure of which is incorporated herein by reference.

TECHNICAL FIELD

The present invention relates to an outdoor unit of an air conditioner that provides air conditioning.

BACKGROUND

An outdoor unit of an air conditioner includes an inverter circuit for converting direct current (DC) power into three-phase alternating current (AC) power using a plurality of switching elements. Such an inverter circuit sequentially turns on and off the switching elements to generate three-phase AC power to drive a compressor motor and a cooling fan motor.

As for the switching elements, an increase in the output of the compressor motor increases the current flowing to the switching elements and thus increases the amount of heat generated in the switching elements. Thus, to prevent the switching elements from undergoing thermal breakdown, the air conditioner of Patent Literature 1 controls the rotational speed of the cooling fan using a temperature detection value detected by a thermistor and the value of current flowing through the compressor motor.

PATENT LITERATURE

Patent Literature 1: Japanese Patent Application Laid-open No. 2015-17734

In the conventional art described in Patent Literature 1 listed above, the air conditioner controls the rotational speed of the cooling fan on the basis of the temperature detection value detected by a thermistor. However, it is difficult for a thermistor to detect a rapid temperature change within a short time period.

Thus, if a semiconductor device that generates a large amount of heat, such as a metal-oxide-semiconductor field-effect transistor (MOSFET), is used as the switching elements, the switching elements may already be in a temperature range in which they may undergo thermal breakdown at the time when control is started to increase the fan rotational speed to increase the cooling performance.

SUMMARY

The present invention has been made in view of the foregoing, and it is an object of the present invention to provide an outdoor unit of an air conditioner capable of operating while preventing thermal breakdown of a switching element.

To solve the problem and achieve the object described above, an outdoor unit of an air conditioner according to an aspect of the present invention includes a compressor-driving inverter circuit to convert direct current power for driving a compressor into pseudo three-phase alternating current power by using a plurality of switching elements. The outdoor unit of an air conditioner according to an aspect of the present invention further includes a fan rotational speed detection unit to detect a fan rotational speed of a fan that cools the switching elements; and an ambient temperature detection unit to detect an ambient temperature at a location where the air conditioner is located. The outdoor unit of an air conditioner according to an aspect of the present invention further includes a compressor inverter drive unit to control a compressor rotational speed of the compressor by controlling the compressor-driving inverter circuit. The compressor inverter drive unit controls the compressor-driving inverter circuit on a basis of the fan rotational speed and the ambient temperature.

The present invention provides an advantage in that it is possible to perform operations while preventing thermal breakdown of a switching element.

DETAILED DESCRIPTION

An outdoor unit of an air conditioner according to embodiments of the present invention will be described in detail below with reference to the drawings. Note that the embodiments are not intended to limit the scope of the present invention.

Embodiment

Figure 1:
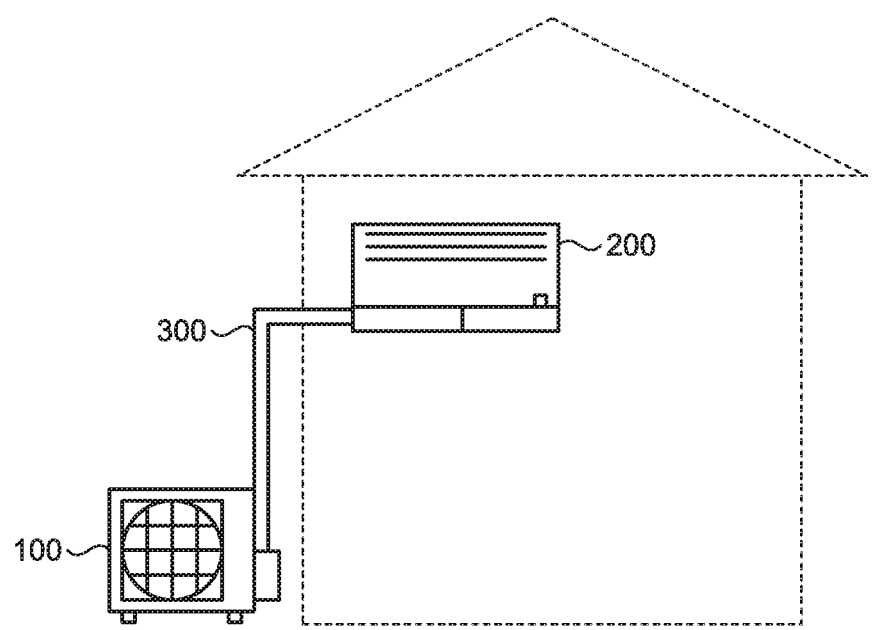
FIG. 1 is a diagram illustrating a configuration of an air conditioner according to an embodiment.

FIG. 1 is a diagram illustrating a configuration of an air conditioner according to an embodiment. The air conditioner according to the embodiment includes an outdoor unit 100 that is an outdoor unit; an indoor unit 200; and a refrigerant pipe 300.

In the air conditioner, the indoor unit 200 installed indoors and the outdoor unit 100 installed outdoors are connected to each other by the refrigerant pipe 300. The air conditioner has a complete refrigeration cycle provided by the outdoor unit 100, the indoor unit 200, and the refrigerant pipe 300. The air conditioner provides indoor air conditioning by using a refrigerant that circulates between the indoor unit 200 and the outdoor unit 100 through the refrigerant pipe 300 to transfer heat between air in the room that is to be air conditioned and outdoor air. In other words, the air conditioner changes the pressure of the refrigerant flowing through the refrigerant pipe 300 by a compressor included in the outdoor unit 100 to cause the refrigerant to absorb heat or dissipate heat in order to provide air conditioning.

Figure 2:
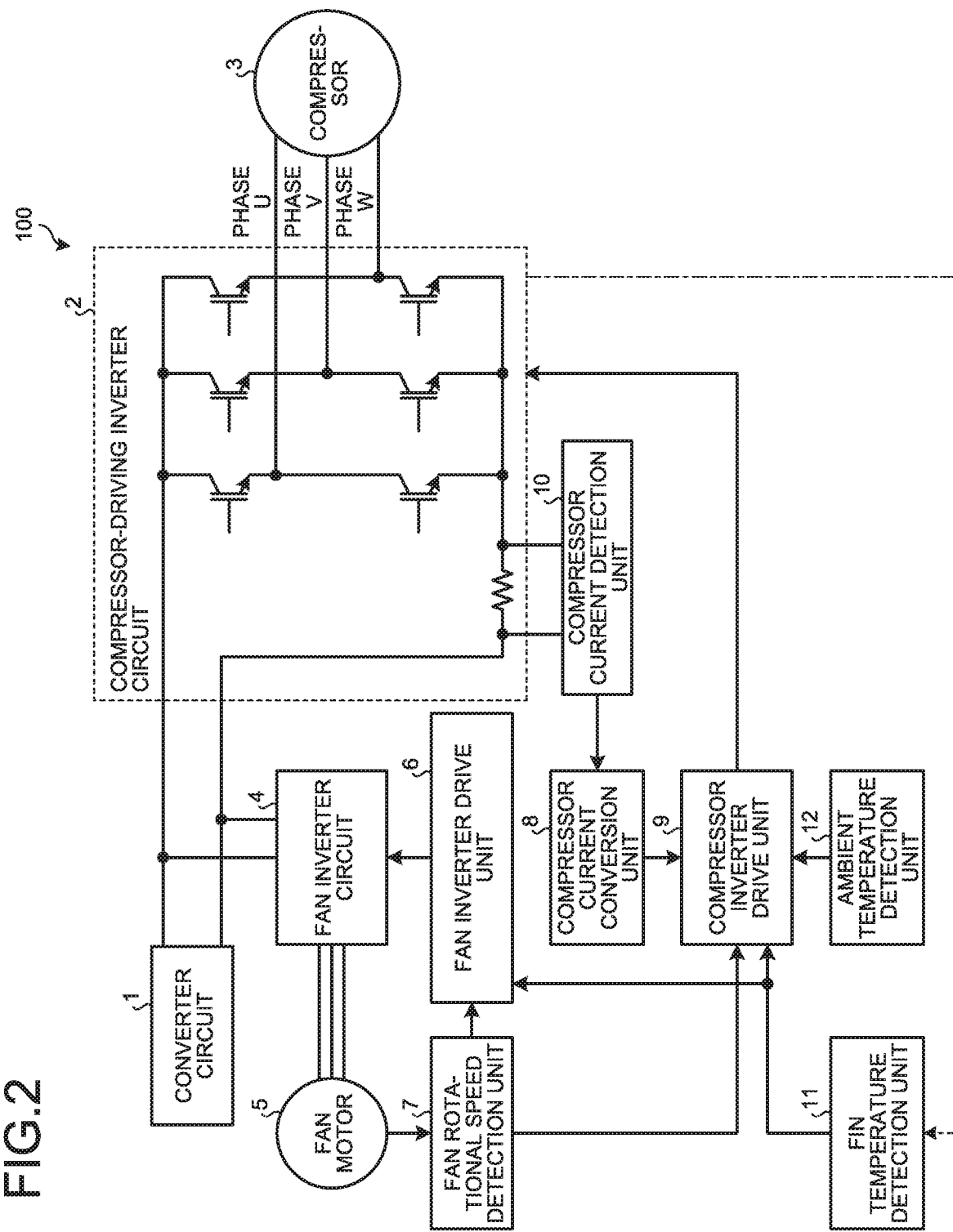
FIG. 2 is a diagram illustrating a configuration of an outdoor unit of the air conditioner according to the embodiment.

FIG. 2 is a diagram illustrating a configuration of the outdoor unit of the air conditioner according to the embodiment. The outdoor unit 100 includes an enclosure (not illustrated) functioning as an outer shell; a fan (not illustrated) housed in the enclosure to generate an airflow while rotating; and a compressor 3 stored in the enclosure. The compressor 3 compresses the refrigerant and circulates the refrigerant. The compressor 3 uses a current from a compressor-driving inverter circuit 2 to compress the refrigerant. A fan motor 5 uses a current from a fan inverter circuit 4 to rotate a fan. The fan rotates to generate an airflow that flows through an outdoor heat exchanger.

The outdoor unit 100 includes the compressor 3; a converter circuit 1 that converts AC power into DC power; the compressor-driving inverter circuit 2 that converts DC power into AC power to drive the compressor 3; and the fan inverter circuit 4 that converts DC power into AC power to drive the fan motor 5. The outdoor unit 100 also includes a compressor inverter drive unit 9 that drives the compressor-driving inverter circuit 2 using pulse width modulation (PWM) control; and a fan inverter drive unit 6 that drives the fan inverter circuit 4 using PWM control. The outdoor unit 100 further includes a fan rotational speed detection unit 7 that detects the fan rotational speed of the fan; an ambient temperature detection unit 12 that detects the ambient temperature; and a fin temperature detection unit 11 that detects the fin temperature. The outdoor unit 100 still further includes a compressor current detection unit 10 that detects the current flowing through the compressor-driving inverter circuit 2; and a compressor current conversion unit 8 that determines a current flowing through the compressor 3.

The compressor-driving inverter circuit 2 converts DC power for driving the compressor 3 into pseudo three-phase AC power using a plurality of switching elements. Specifically, the compressor-driving inverter circuit 2 converts DC power supplied from the converter circuit 1 into AC power using the switching elements. The compressor-driving inverter circuit 2 drives the compressor 3 using the pseudo three-phase AC power generated by the conversion. The compressor-driving inverter circuit 2 converts DC power into the pseudo three-phase AC power having phases of a phase U, a phase V, and a phase W. The compressor-driving inverter circuit 2 provides control to drive the compressor 3 on the basis of a PWM signal that is a pulse width modulated signal from the compressor inverter drive unit 9.

The fan inverter circuit 4 converts DC power supplied from the converter circuit 1 into AC power using a plurality of switching elements. The fan inverter circuit 4 drives the fan motor 5 using pseudo three-phase AC power generated by the conversion. The fan inverter circuit 4 converts DC power into the pseudo three-phase AC power having phases of a phase U, a phase V, and a phase W. The fan inverter circuit 4 provides control to drive the fan motor 5 on the basis of a PWM signal from the fan inverter drive unit 6.

The fin temperature detection unit 11 is a sensor for detecting the temperature of fins (i.e., fin temperature). The fin temperature detection unit 11 includes a fin temperature thermistor. The fin temperature detection unit 11 is provided on a fin portion of a heat sink. The heat sink is provided on the switching elements disposed in the compressor-driving inverter circuit 2 or in an inverter module including the compressor-driving inverter circuit 2. The heat sink is provided to cool the switching elements disposed in the compressor-driving inverter circuit 2. The heat sink disposed on the switching elements is exposed to an airflow from the fan. Thus, the airflow from the fan serves as a cooling wind for the switching elements. The fin temperature detection unit 11 sends the detected fin temperature to the fan inverter drive unit 6 and to the compressor inverter drive unit 9.

The ambient temperature detection unit 12 is an ambient temperature detection sensor for detecting the ambient temperature. The ambient temperature detection unit 12 includes an ambient temperature thermistor. The ambient temperature detection unit 12 is disposed on the inlet-side surface of the heat exchanger cooling air channel included in the outdoor unit 100 of the air conditioner. The ambient temperature detection unit 12 detects the peripheral temperature of the outdoor unit 100 of the air conditioner. Specifically, the ambient temperature detection unit 12 detects the ambient temperature at the location where the outdoor unit 100 of the air conditioner is located. The ambient temperature detection unit 12 sends the detected ambient temperature to the compressor inverter drive unit 9.

The compressor current detection unit 10 is connected to the wiring in the compressor-driving inverter circuit 2. The compressor current detection unit 10 detects the value of the voltage across both ends of a shunt resistor in the compressor-driving inverter circuit 2 to detect the value of the current flowing through the compressor 3. In other words, the compressor current detection unit 10 detects the voltage value proportional to the value of the current flowing through the compressor 3. The compressor current detection unit 10 sends the detected voltage value to the compressor current conversion unit 8.

The compressor current conversion unit 8 converts the voltage value sent from the compressor current detection unit 10 into a current value, i.e., a compressor current value. The compressor current conversion unit 8 sends information indicating the compressor current value to the compressor inverter drive unit 9.

The fan rotational speed detection unit 7 detects the fan rotational speed of the fan on the basis of information obtained from the fan motor 5. The fan rotational speed detection unit 7 sends the detected fan rotational speed to the fan inverter drive unit 6 and to the compressor inverter drive unit 9. The fan rotational speed detection unit 7 counts the pulse signal, which is output once per revolution from the fan motor 5, for a certain detection period to detect the fan rotational speed. The fan rotational speed detection unit 7 may detect the rotational speed using any other method.

The fan inverter drive unit 6 controls the fan inverter circuit 4 with respect to the fan rotational speed on the basis of the fan rotational speed from the fan rotational speed detection unit 7 and information indicating the fin temperature from the fin temperature detection unit 11. The fan inverter drive unit 6 controls the fan inverter circuit 4 with respect to the fan rotational speed to, in turn, control the fan speed.

The compressor inverter drive unit 9 receives the compressor current value from the compressor current conversion unit 8 and the fan rotational speed from the fan rotational speed detection unit 7. The compressor inverter drive unit 9 also receives the information indicating the fin temperature from the fin temperature detection unit 11, and receives the information indicating the ambient temperature from the ambient temperature detection unit 12.

The compressor inverter drive unit 9 controls the compressor-driving inverter circuit 2 on the basis of the compressor current value, the fan rotational speed, the fin temperature, and the ambient temperature. The compressor inverter drive unit 9 calculates the present amount of electrical current flowing through the compressor 3 on the basis of the compressor current value. The compressor inverter drive unit 9 estimates the operational state of the compressor 3 on the basis of the calculated amount of electrical current, and then controls the rotational speed of the compressor 3, i.e., compressor rotational speed, on the basis of the estimation result.

The compressor inverter drive unit 9 of the present embodiment controls the compressor-driving inverter circuit 2 such that the compressor rotational speed is changed on the basis of the fan rotational speed and the ambient temperature. Note that the compressor inverter drive unit 9 may control the compressor-driving inverter circuit 2 such that the compressor rotational speed is changed on the basis of the fan rotational speed or the ambient temperature. Alternatively, the compressor inverter drive unit 9 may control the compressor-driving inverter circuit 2 such that the compressor rotational speed is changed on the basis of at least one of the fan rotational speed and the ambient temperature as well as the fin temperature.

The outdoor unit 100 may previously store a threshold of the current flowing through the compressor-driving inverter circuit 2. In this case, when the current flowing through the compressor-driving inverter circuit 2 exceeds the threshold, the compressor inverter drive unit 9 or the converter circuit 1 of the outdoor unit 100 immediately stops the operation of the compressor 3. In a case in which the compressor inverter drive unit 9 stops the operation of the compressor 3, the compressor inverter drive unit 9 controls the compressor-driving inverter circuit 2 such that the operation of the compressor 3 is stopped. Thus, the outdoor unit 100 has an overcurrent protection function to protect the compressor-driving inverter circuit 2. The outdoor unit 100 can thus prevent breakdown of a switching element due to an overcurrent from flowing through the compressor-driving inverter circuit 2.

Figure 3:
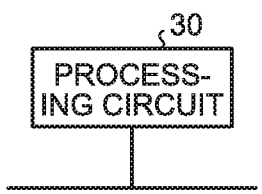
FIG. 3 is a diagram illustrating that components included in the outdoor unit of the embodiment is a processing circuit.

Part or all of the functions of the components included in the outdoor unit 100 may be implemented in a processing circuit 30 described later herein. FIG. 3 is a diagram illustrating that components included in the outdoor unit of the embodiment are implemented in a processing circuit. The processing circuit 30 is a dedicated hardware element. The processing circuit 30 is a single circuit, a composite circuit, a programmed processor, a parallel-programmed processor, an application specific integrated circuit (ASIC), or a field-programmable gate array (FPGA), or a combination thereof. Part of the components that constitute the processing circuit 30 may form a separate dedicated hardware element from the other components.

In the present embodiment, the compressor inverter drive unit 9 of the outdoor unit 100 may be implemented in the processing circuit 30. In addition, at least one of the fan inverter drive unit 6, the fan rotational speed detection unit 7, the compressor current conversion unit 8, the compressor inverter drive unit 9, and the compressor current detection unit 10 included in the outdoor unit 100 may be implemented in the processing circuit 30.

Alternatively, part of the components included in the outdoor unit 100 may be implemented by a processor 91 described later herein that executes a program. In this case, the part of the components included in the outdoor unit 100 has their functions implemented by the processor 91 using a memory that is the main memory. A case will herein be described in which the control function of the compressor inverter drive unit 9 of the outdoor unit 100 is implemented by the processor 91.

Figure 4:
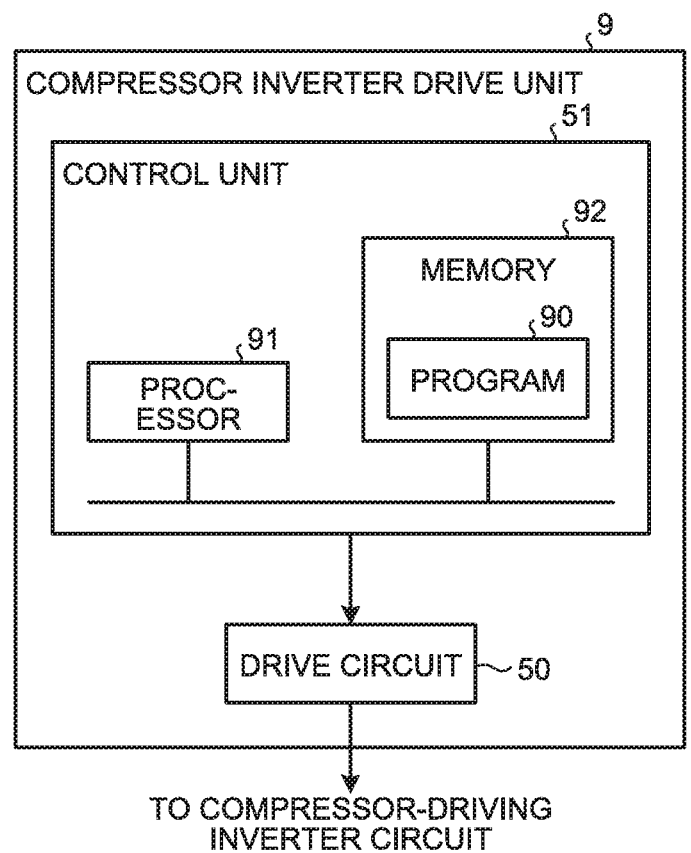
FIG. 4 is a diagram illustrating an example configuration of a compressor inverter drive unit included in the outdoor unit of the embodiment.

FIG. 4 is a diagram illustrating an example configuration of the compressor inverter drive unit included in the outdoor unit of the embodiment. FIG. 4 illustrates a case in which part or all of the components included in the compressor inverter drive unit 9 are implemented by a control unit 51 and a drive circuit 50. The control unit 51 is connected to the drive circuit 50. The drive circuit 50 is connected to the compressor-driving inverter circuit 2. The drive circuit 50 outputs a signal to the compressor-driving inverter circuit 2 in response to an instruction from the control unit 51. In the compressor inverter drive unit 9 having a configuration as illustrated in FIG. 2, the control unit 51 is implemented in software, while the drive circuit 50 is implemented in hardware.

The control unit 51 includes the processor 91 and a memory 92. The processor 91 is a central processing unit (CPU), a processing device, a computing unit, a microprocessor, a microcomputer, or a digital signal processor (DSP). The processor 91 executes a program 90 stored in the memory 92.

In a case in which part or all of the components included in the compressor inverter drive unit 9 are implemented by the processor 91, the control unit 51 implements the functions of the compressor inverter drive unit 9. That is, the functions of at least part of the components constituting the compressor inverter drive unit 9 are implemented by the processor 91 and the program 90. The program 90 is software, firmware, or a combination of software and firmware. The software or firmware is described as the program 90 and is stored in the memory 92. The processor 91 reads and executes the program 90 stored in the memory 92 to perform the functions of the components that constitute the compressor inverter drive unit 9.

The program 90 executed by the processor 91 is a computer program product including a non-transitory computer-readable recording medium containing a plurality of computer-executable instructions for driving the compressor-driving inverter circuit 2. The program 90 executed by the processor 91 has a plurality of instructions that cause a computer to provide control of the compressor-driving inverter circuit 2.

The program 90 executed by the processor 91 is stored in advance in the memory 92. In other words, the program 90 stored in the memory 92 causes a computer to perform a procedure or method of the components constituting the compressor-driving inverter circuit 2. The memory 92 may be a non-volatile semiconductor memory or a volatile semiconductor memory. The memory 92 may also be a random access memory (RAM), a read-only memory (ROM), a flash memory, an erasable programmable read-only memory (EPROM), or an electrically erasable programmable read-only memory (EEPROM). The memory 92 may otherwise be a magnetic disk, a flexible disk, an optical disk, a compact disc, a MiniDisc, or a digital versatile disk (DVD).

Some of the functions of a plurality of components constituting the compressor inverter drive unit 9 may be implemented in a dedicated hardware element and the other functions may be implemented in software or firmware. Thus, the functions of a plurality of components constituting the compressor inverter drive unit 9 can be implemented in hardware, software, firmware, or a combination thereof.

Note that at least one of the fan inverter drive unit 6, the fan rotational speed detection unit 7, the compressor current conversion unit 8, the compressor inverter drive unit 9, and the compressor current detection unit 10 included in the outdoor unit 100 may be implemented using the processor 91.

Figure 5:
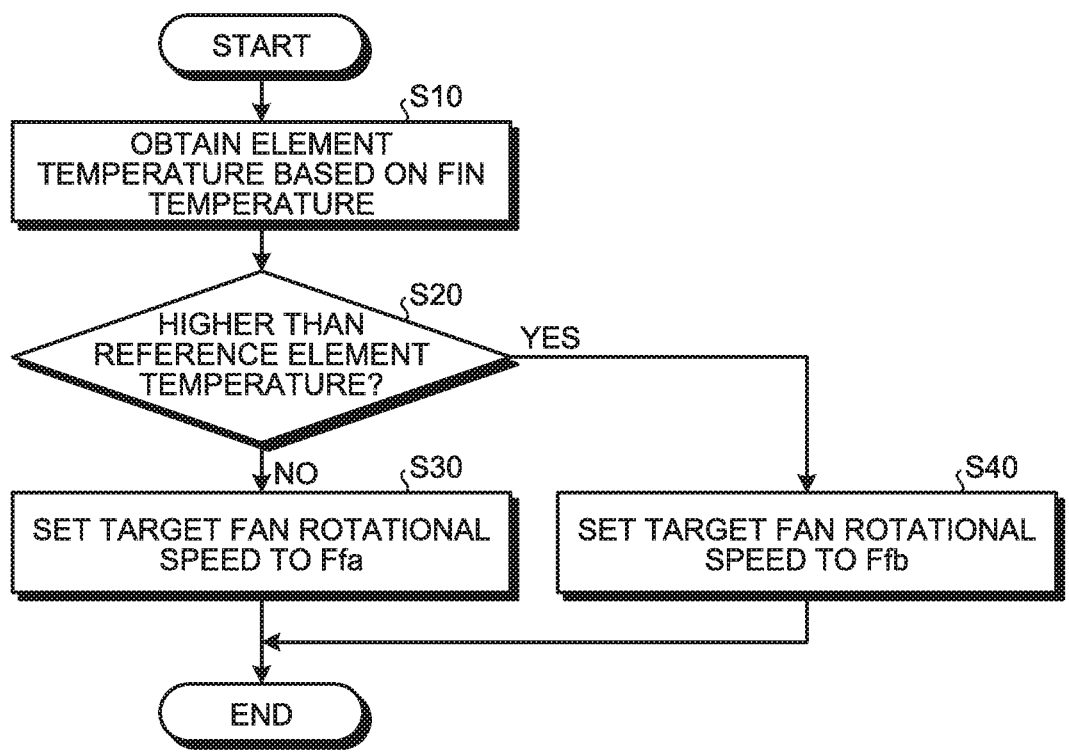
FIG. 5 is a flowchart illustrating a procedure of controlling the fan rotational speed.

A process for controlling the fan rotational speed of the fan performed by the fan inverter drive unit 6 will now be described. FIG. 5 is a flowchart illustrating a procedure of controlling the fan rotational speed. In the outdoor unit 100, the fin temperature detection unit 11 detects the temperature of the fin portion. The fin temperature detection unit 11 sends the fin temperature, which represents the detected temperature, to the fan inverter drive unit 6. Thus, the fan inverter drive unit 6 obtains information indicating the fin temperature.

The fan inverter drive unit 6 calculates the temperature of the switching elements included in the compressor-driving inverter circuit 2 on the basis of the information indicating the fin temperature. The fan inverter drive unit 6 calculates the temperature of the switching elements, i.e., element temperature, from the fin temperature using the fin structure, the fin material, the location where the fin temperature detection unit 11 is disposed, the switching element structure, or the environment at the location where the outdoor unit 100 is installed. Thus, at step S10, the fan inverter drive unit 6 obtains the element temperature on the basis of the fin temperature. Thus, the fan inverter drive unit 6 estimates the present element temperature of the switching elements on the basis of the fin temperature sent from the fin temperature detection unit 11.

The fan inverter drive unit 6 compares the element temperature with a reference temperature of switching element, i.e., reference element temperature. At step S20, the fan inverter drive unit 6 determines whether the element temperature is higher than the reference element temperature.

If the fan inverter drive unit 6 determines that the element temperature is at or below the reference element temperature, i.e., No at step S20, then the fan inverter drive unit 6 sets the rotational speed of the fan to a normal target fan rotational speed Ffa at step S30. The fan inverter drive unit 6 thus drives the fan inverter circuit 4 to cause the fan to rotate at the set target fan rotational speed Ffa. This operation causes the fan inverter circuit 4 to control the fan motor 5 such that the fan rotates at the target fan rotational speed Ffa. Thus, if the element temperature is at or below the reference element temperature, the fan motor 5 rotates the fan at the target fan rotational speed Ffa.

Otherwise, if the fan inverter drive unit 6 determines that the element temperature is higher than the reference element temperature, i.e., Yes at step S20, then the fan inverter drive unit 6 sets the rotational speed of the fan to a target fan rotational speed Ffb, which is higher than the normal value, at step S40. The target fan rotational speed Ffb is a rotational speed higher than the normal target fan rotational speed Ffa. That is, the target fan rotational speed Ffb and the normal target fan rotational speed Ffa have a relationship of Ffa<Ffb.

The fan inverter drive unit 6 then drives the fan inverter circuit 4 to cause the fan to rotate at the set target fan rotational speed Ffb. This operation causes the fan inverter circuit 4 to control the fan motor 5 such that the fan rotates at the target fan rotational speed Ffb. Thus, if the element temperature is higher than the reference element temperature, the fan motor 5 rotates the fan at the target fan rotational speed Ffb. The outdoor unit 100 can thus increase the cooling air volume to the switching elements as the fan speed increases.

As described above, if the fan inverter drive unit 6 determines that the element temperature of the switching elements is higher than the reference element temperature on the basis of the fin temperature, the fan inverter drive unit 6 increases the fan speed to increase the cooling air volume. In other words, upon determination, on the basis of the fin temperature, that the amount of heat generation of the switching elements is greater than a reference amount of heat generation, the fan inverter drive unit 6 increases the fan speed to increase the cooling air volume. Accordingly, if the element temperature of the switching elements is higher than the reference element temperature, the outdoor unit 100 can reduce the element temperature of the switching elements.

Figure 6:
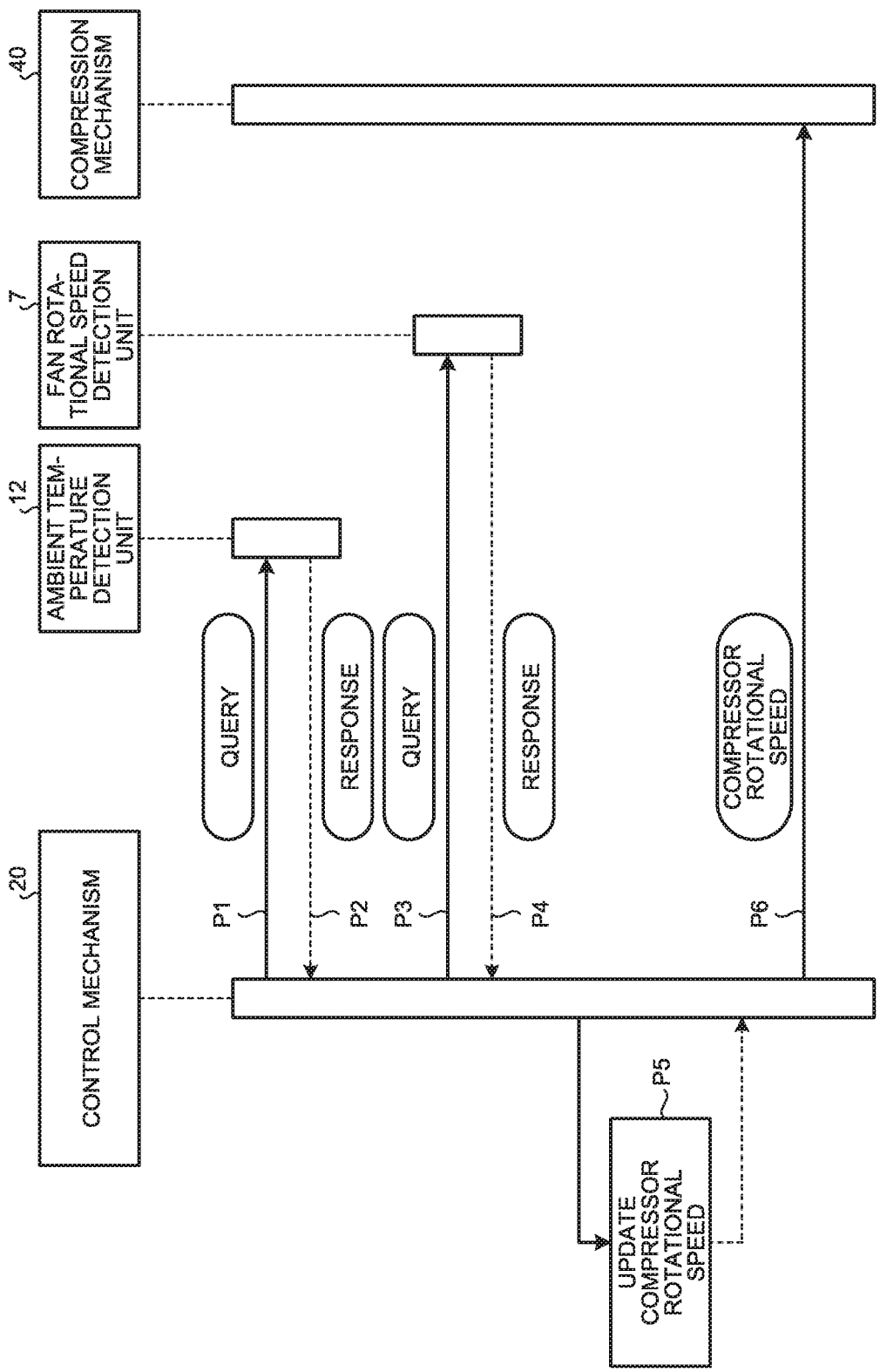
FIG. 6 is a sequence chart illustrating a procedure of controlling the compressor-driving inverter circuit.

The process, performed by the compressor inverter drive unit 9, of controlling the operation of the compressor-driving inverter circuit 2 will next be described. FIG. 6 is a sequence chart illustrating a procedure of controlling the compressor-driving inverter circuit. Note that a control mechanism 20 illustrated in FIG. 6 corresponds to the compressor inverter drive unit 9 and a compression mechanism 40 illustrated in FIG. 6 corresponds to the compressor-driving inverter circuit 2.

In the outdoor unit 100, the ambient temperature detection unit 12 detects the ambient temperature. In the process P1, the control mechanism 20 corresponding to the compressor inverter drive unit 9 sends a query for the ambient temperature to the ambient temperature detection unit 12. Then, in the process P2, the ambient temperature detection unit 12 sends the detected ambient temperature to the control mechanism 20.

In the process P3, the control mechanism 20 sends a query for the fan rotational speed to the fan rotational speed detection unit 7. Then, in the process P4, the fan rotational speed detection unit 7 sends the detected fan rotational speed to the control mechanism 20. Thus, the control mechanism 20 acquires information indicating the ambient temperature and information indicating the fan rotational speed. The outdoor unit 100 may perform any one of the processes P1 and P3 first.

After performing the processes P1 to P4, in the process P5, the control mechanism 20 updates the rotational speed that is set for the compressor 3, i.e., compressor rotational speed. In this process, the control mechanism 20 estimates the present cooling performance to which the switching elements are subjected on the basis of the ambient temperature and the fan rotational speed. The control mechanism 20 then calculates the compressor rotational speed on the basis of the present cooling performance to which the switching elements are subjected. The control mechanism 20 updates the compressor rotational speed by setting the calculated compressor rotational speed as the latest compressor rotational speed.

The cooling air volume caused by the fan relates to the fan rotational speed. The cooling performance to which the switching elements are subjected is affected by the cooling air volume and the ambient temperature. Accordingly, the control mechanism 20 of the present embodiment calculates the present cooling performance to which the switching elements are subjected on the basis of the ambient temperature and the fan rotational speed, and calculates the maximum capability of the compressor 3 on the basis of the calculated cooling performance. This maximum capability of the compressor 3 is what is set as the updated value of the compressor rotational speed in the process P5. After updating the compressor rotational speed, the control mechanism 20 indicates the compressor rotational speed to the compression mechanism 40 functioning as the compressor-driving inverter circuit 2 in process P6.

The compressor rotational speed will now be described. If the fan rotational speed is fixed at a fan rotational speed F, the compressor inverter drive unit 9 sets the compressor rotational speed on the basis of the ambient temperature. Alternatively, if the ambient temperature is constant, the compressor inverter drive unit 9 sets the compressor rotational speed on the basis of the fan rotational speed.

Figure 7:
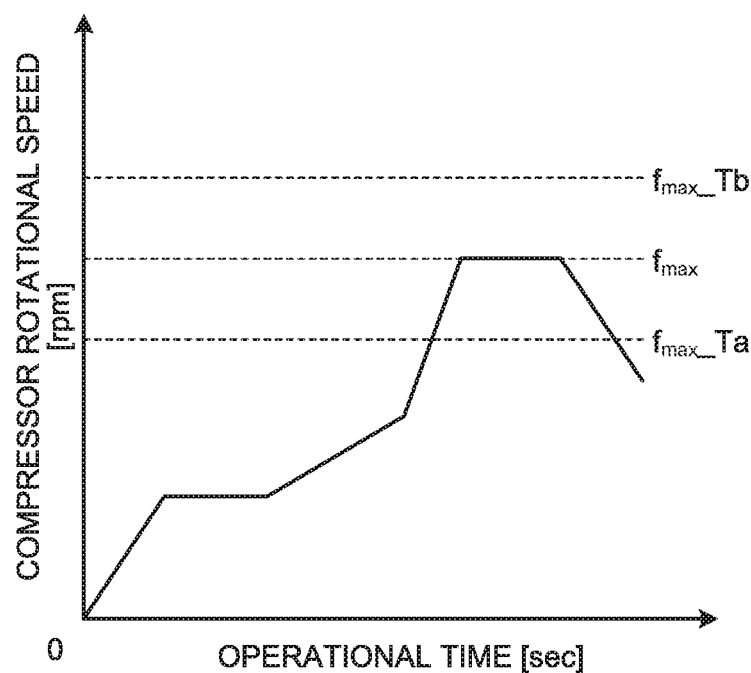
FIG. 7 is a diagram for describing the compressor rotational speed at a fixed fan rotational speed.

FIG. 7 is a diagram for describing the compressor rotational speed at a fixed fan rotational speed. In the graph illustrated in FIG. 7, the vertical axis represents the compressor rotational speed, which is the rotational speed set for the compressor 3, and the horizontal axis represents the operational time. The compressor rotational speed $f_{max}$ represents the maximum value of the compressor rotational speed that is set by the compressor inverter drive unit 9 when the ambient temperature is at the reference value, i.e., ambient temperature T, and the fan rotational speed is at the reference rotational speed, i.e., fan rotational speed F. The compressor rotational speed $f_{max}$ is the maximum permitted value of the compressor rotational speed settable for the compressor-driving inverter circuit 2.

Note that compressor rotational speeds $f_{max\_}Ta$, $f_{max\_}Tb$, $f_{max\_}Fc$, and $f_{max\_}Fd$ described later are also maximum permitted values of the compressor rotational speed settable for the compressor-driving inverter circuit 2. The compressor rotational speed $f_{max\_}Ta$ is the maximum permitted value of the compressor rotational speed when the ambient temperature is at an ambient temperature Ta. The compressor rotational speed $f_{max\_}Tb$ is the maximum permitted value of the compressor rotational speed when the ambient temperature is at an ambient temperature Tb. The compressor rotational speed $f_{max\_}Fc$ is the maximum permitted value of the compressor rotational speed when the fan rotational speed is at a fan rotational speed Fc. The compressor rotational speed $f_{max\_}Fd$ is the maximum permitted value of the compressor rotational speed when the fan rotational speed is at a fan rotational speed Fd.

If the fan rotational speed F is fixed and the ambient temperature becomes an ambient temperature Ta that satisfies T<Ta, the cooling performance to which the switching elements are subjected decreases. Accordingly, the compressor inverter drive unit 9 reduces the compressor rotational speed $f_{max}$. That is, the compressor inverter drive unit 9 updates the maximum permitted value with the compressor rotational speed $f_{max\_}Ta$ that satisfies $f_{max\_}Ta<f_{max}$.

According to this operation, when the ambient temperature exceeds the reference value, i.e., the ambient temperature T, the compressor inverter drive unit 9 controls the compressor-driving inverter circuit 2 such that the compressor rotational speed of the compressor 3 is lower than the reference rotational speed, i.e., the compressor rotational speed $f_{max}$.

The compressor inverter drive unit 9 may control the compressor-driving inverter circuit 2 such that a higher ambient temperature results in a lower compressor rotational speed $f_{max\_}Ta$. This control can reduce the rotational speed of the compressor 3 to a lower value as the ambient temperature increases, thereby enabling the switching elements to be cooled with lower cooling performance.

Meanwhile, if the fan rotational speed F is fixed and the ambient temperature becomes an ambient temperature Tb that satisfies Tb<T, the cooling performance to which the switching elements are subjected increases.

Accordingly, the compressor inverter drive unit 9 increases the compressor rotational speed $f_{max}$. That is, the compressor inverter drive unit 9 updates the maximum permitted value with the compressor rotational speed $f_{max\_}Tb$ that satisfies $f_{max}<f_{max\_}Tb$.

According to this operation, when the ambient temperature falls below the reference value, i.e., the ambient temperature T, the compressor inverter drive unit 9 controls the compressor-driving inverter circuit 2 such that the compressor rotational speed of the compressor 3 is higher than the reference rotational speed, i.e., the compressor rotational speed $f_{max}$.

The compressor inverter drive unit 9 may control the compressor-driving inverter circuit 2 such that a lower ambient temperature results in a higher compressor rotational speed $f_{max\_}Tb$. This control can cool the switching elements with high cooling performance at a low ambient temperature even when the rotational speed of the compressor 3 is high.

Figure 8:
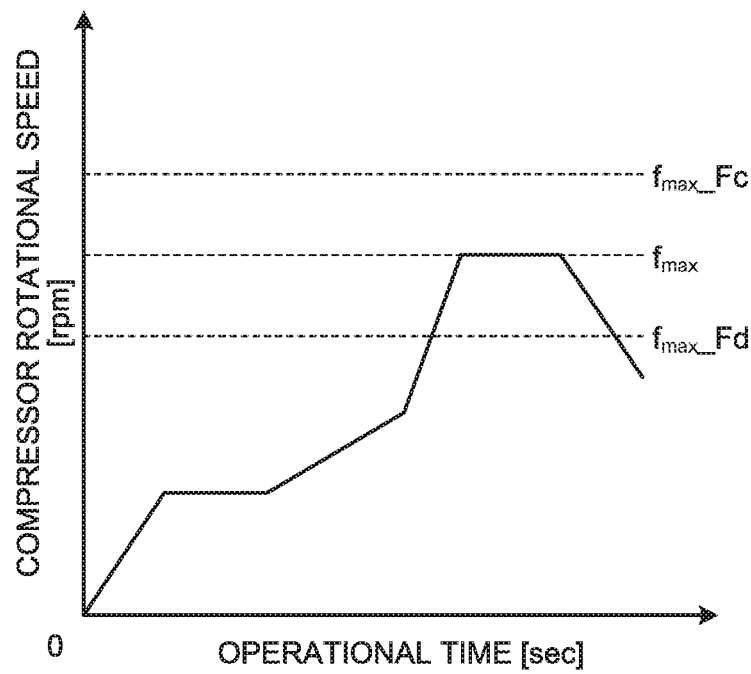
FIG. 8 is a diagram for describing the compressor rotational speed at a constant ambient temperature.

FIG. 8 is a diagram for describing the compressor rotational speed at a constant ambient temperature. In the graph illustrated in FIG. 8, the vertical axis represents the compressor rotational speed, which is the rotational speed set for the compressor 3, and the horizontal axis represents the operational time. The compressor rotational speed $f_{max}$ represents the maximum value of the compressor rotational speed that is set by the compressor inverter drive unit 9 when the ambient temperature is at the reference value, i.e., the ambient temperature T, and the fan rotational speed is at the reference rotational speed, i.e., the fan rotational speed F.

If the ambient temperature T is fixed and the fan rotational speed becomes the fan rotational speed Fc that satisfies F<Fc, the cooling performance to which the switching elements are subjected increases. Accordingly, the compressor inverter drive unit 9 increases the compressor rotational speed $f_{max}$. That is, the compressor inverter drive unit 9 updates the maximum permitted value with the compressor rotational speed $f_{max\_}Fc$ that satisfies $f_{max}<f_{max\_}FC$.

According to this operation, when the fan rotational speed exceeds the reference value, i.e., the fan rotational speed F, the compressor inverter drive unit 9 controls the compressor-driving inverter circuit 2 such that the compressor rotational speed of the compressor 3 is higher than the reference rotational speed, i.e., the compressor rotational speed $f_{max}$.

The compressor inverter drive unit 9 may control the compressor-driving inverter circuit 2 such that a higher fan rotational speed results in a higher compressor rotational speed $f_{max\_}Fc$. This control can cool the switching elements with high cooling performance at a high fan rotational speed even when the rotational speed of the compressor 3 increases.

Meanwhile, if the ambient temperature T is fixed and the fan rotational speed becomes the fan rotational speed Fd that satisfies Fd<F, the cooling performance to which the switching elements are subjected decreases. Accordingly, the compressor inverter drive unit 9 reduces the compressor rotational speed $f_{max}$. That is, the compressor inverter drive unit 9 updates the maximum permitted value with the compressor rotational speed $f_{max\_}Fd$ that satisfies $f_{max\_}Fd<f_{max}$.

According to this operation, when the fan rotational speed falls below the reference value, i.e., the fan rotational speed F, the compressor inverter drive unit 9 controls the compressor-driving inverter circuit 2 such that the compressor rotational speed of the compressor 3 is lower than the reference rotational speed, i.e., the compressor rotational speed $f_{max}$.

The compressor inverter drive unit 9 may control the compressor-driving inverter circuit 2 such that a lower fan rotational speed results in a lower compressor rotational speed $f_{max\_}Fd$. This control can reduce the rotational speed of the compressor 3 at a low fan rotational speed and can thus cool the switching elements with lower cooling performance.

Although FIG. 7 illustrates a case where the fan rotational speed is fixed and FIG. 8 illustrates a case where the ambient temperature is fixed, both the fan rotational speed and the ambient temperature may vary. In this case, the compressor inverter drive unit 9 calculates the cooling performance to which the switching elements are subjected on the basis of the fan rotational speed and the ambient temperature, and sets the compressor rotational speed corresponding to the calculated cooling performance to which the switching elements are subjected. Specifically, the compressor inverter drive unit 9 reduces the compressor rotational speed if the cooling performance to which the switching elements are subjected will decrease, while the compressor inverter drive unit 9 increases the compressor rotational speed if the cooling performance to which the switching elements are subjected will increase.

As described above, the outdoor unit 100 of the air conditioner according to the present embodiment converts input AC power into DC power in the converter circuit 1. The outdoor unit 100 then reconverts DC power into AC power in the compressor-driving inverter circuit 2 and in the fan inverter circuit 4 to respectively control driving of the compressor 3 and the fan motor 5.

The compressor inverter drive unit 9 obtains information on the cooling air volume, i.e., the fan rotational speed, from the fan rotational speed detection unit 7, and obtains information on the peripheral temperature of the outdoor unit 100, i.e., the ambient temperature, from the ambient temperature detection unit 12. The compressor inverter drive unit 9 then estimates the cooling performance to which the switching elements included in the compressor-driving inverter circuit 2 are subjected on the basis of the fan rotational speed and the ambient temperature. Furthermore, the compressor inverter drive unit 9 sets the compressor rotational speed corresponding to the cooling performance to which the switching elements are subjected and controls the compressor-driving inverter circuit 2 using the set compressor rotational speed. The compressor rotational speed used in the control of the compressor-driving inverter circuit 2 corresponds to the maximum operational range of the compressor 3.

The control described above enables the compressor inverter drive unit 9 to set a safe operating range defined by the compressor rotational speed before the state of the switching elements of the compressor-driving inverter circuit 2 transitions to an operating range in which these switching elements are likely to undergo thermal breakdown. The outdoor unit 100 can thus perform an operation without causing thermal breakdown of a switching element.

Note that an operation of an air conditioner in a heating mode means that the outdoor temperature is low, which in turn means that the ambient temperature is lower than the ambient temperature when the air conditioner is operating in a cooling mode. This causes the cooling performance to which the switching elements are subjected to be higher during air conditioning in a heating mode than during air conditioning in a cooling mode for the same fan rotational speed. Therefore, the compressor inverter drive unit 9 can operate with a higher output of the compressor 3 during air conditioning in a heating mode than during air conditioning in a cooling mode. This operation enables the compressor inverter drive unit 9 to increase the operational performance range of the outdoor unit 100.

As described above, according to the embodiment, the compressor inverter drive unit 9 sets the compressor rotational speed of the compressor 3 on the basis of the fan rotational speed and the ambient temperature, thereby enabling the outdoor unit 100 of the air conditioner to operate while preventing thermal breakdown of a switching element. In addition, because the compressor inverter drive unit 9 sets the compressor rotational speed of the compressor 3 on the basis of the ambient temperature, the outdoor unit 100 of the air conditioner can increase the air conditioning performance.

Note that the air conditioner of the embodiment described above is not limited to that including all the described components. Part of the configuration of one embodiment example may be replaced by part of the configuration of another embodiment. In addition, part of the configuration of one embodiment may be added to part of the configuration of another embodiment. Moreover, part of the configuration of any one embodiment may be added to, deleted from, and/or replaced by part of another configuration.

The invention claimed is:

1. An outdoor unit of an air conditioner, the outdoor unit comprising:
   a compressor-driving inverter circuit to convert direct current power for driving a compressor into pseudo three-phase alternating current power by using a plurality of switching elements;
   a fan rotational speed detector to detect a fan rotational speed of a fan that cools the switching elements;
   an ambient temperature detector to detect an ambient temperature at a location where the air conditioner is located; and
   a compressor inverter driver to control a compressor rotational speed of the compressor by controlling the compressor-driving inverter circuit, wherein
   the compressor inverter driver controls the compressor-driving inverter circuit on a basis of the fan rotational speed and the ambient temperature and controls the compressor-driving inverter circuit such that the compressor rotational speed is higher than a reference rotational speed when the fan rotational speed becomes higher than a reference value.

2. The outdoor unit of an air conditioner according to claim 1, wherein the compressor inverter driver controls the compressor-driving inverter circuit such that the compressor rotational speed increases as the fan rotational speed increases.

3. The outdoor unit of an air conditioner according to claim 1, wherein the compressor inverter driver controls the compressor-driving inverter circuit such that the compressor rotational speed is lower than a reference rotational speed when the ambient temperature becomes higher than a reference value.

4. The outdoor unit of an air conditioner according to claim 1, wherein the compressor inverter driver controls the compressor-driving inverter circuit such that the compressor rotational speed decreases as the ambient temperature increases.

5. The outdoor unit of an air conditioner according to claim 1, further comprising:
   a fin temperature detector to detect a fin temperature that is a temperature of a fin portion of a heat sink, wherein
   the compressor inverter driver controls the compressor-driving inverter circuit on a basis of the fan rotational speed, the ambient temperature, and the fin temperature.

6. The outdoor unit of an air conditioner according to claim 1, further comprising:
   a fin temperature detector to detect a fin temperature that is a temperature of a fin portion of a heat sink; and
   a fan inverter driver to control the fan rotational speed on a basis of the fan rotational speed and the fin temperature.

7. The outdoor unit of an air conditioner according to claim 1, further comprising:

a compressor current detector to detect a current flowing through the compressor-driving inverter circuit, wherein, when the current exceeds a threshold, the compressor inverter driver controls the compressor-driving inverter circuit such that the compressor is stopped.

\* \* \* \* \*